(12) United States Patent
Chen et al.

(10) Patent No.: US 12,309,409 B2
(45) Date of Patent: May 20, 2025

(54) ALF APS CONSTRAINTS IN VIDEO CODING

(71) Applicant: Huawei Technologies Co., Ltd., Shenzhen (CN)

(72) Inventors: Jianle Chen, San Diego, CA (US); Fnu Hendry, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 121 days.

(21) Appl. No.: 17/666,307

(22) Filed: Feb. 7, 2022

(65) Prior Publication Data

US 2022/0159285 A1 May 19, 2022

Related U.S. Application Data

(63) Continuation of application No. PCT/US2020/041666, filed on Jul. 10, 2020.

(60) Provisional application No. 62/888,267, filed on Aug. 16, 2019.

(51) Int. Cl.
*H04N 19/46* (2014.01)
*H04N 19/117* (2014.01)
*H04N 19/169* (2014.01)
*H04N 19/186* (2014.01)
*H04N 19/82* (2014.01)

(52) U.S. Cl.
CPC ............ *H04N 19/46* (2014.11); *H04N 19/117* (2014.11); *H04N 19/186* (2014.11); *H04N 19/188* (2014.11); *H04N 19/82* (2014.11)

(58) Field of Classification Search
CPC .... H04N 19/46; H04N 19/117; H04N 19/186; H04N 19/188; H04N 19/82; H04N 19/463; H04N 19/70
See application file for complete search history.

(56) References Cited

U.S. PATENT DOCUMENTS

| | | |
|---|---|---|
| 9,807,403 B2 | 10/2017 | Chong et al. |
| 2013/0101018 A1 | 4/2013 | Chong |
| 2013/0259118 A1 | 10/2013 | Fu et al. |

(Continued)

FOREIGN PATENT DOCUMENTS

| | | |
|---|---|---|
| GB | 2581855 A | 9/2020 |
| RU | 2630369 C1 | 9/2017 |
| WO | 2013031315 A1 | 3/2013 |

OTHER PUBLICATIONS

Document: JVET-O0288-v1, Chubach, O., et al, "CE5-related: On the syntax constraints of ALF APS," Joint Video Experts Team (JVET)of ITU-T SG 16 WP 3 and ISO/IEC JTC 1/SC 29/WG 11, 15th Meeting: Gothenburg, SE, Jul. 3-12, 2019, 5 pages.

(Continued)

*Primary Examiner* — Nasim N Nirjhar
(74) *Attorney, Agent, or Firm* — Conley Rose, P.C.

(57) ABSTRACT

A video coding mechanism is disclosed. The mechanism includes receiving a bitstream comprising an adaptive loop filter (ALF) adaptation parameter set (APS) including an ALF luma filter signal flag (alf_luma_filter_signal_flag) and a ALF chroma filter signal flag (alf_chroma_filter_signal_flag), wherein at least one of the alf_luma_filter_signal_flag or the alf_chroma_filter_signal_flag is equal to one. A slice is decoded based on ALF parameters in the ALF APS. The slice is forwarded for display as part of a decoded video sequence.

12 Claims, 9 Drawing Sheets

(56) References Cited

U.S. PATENT DOCUMENTS

| | | |
|---|---|---|
| 2015/0016506 A1 | 1/2015 | Fu |
| 2016/0234492 A1 | 8/2016 | Li et al. |
| 2019/0149846 A1 | 5/2019 | Fu |
| 2019/0234492 A1 | 8/2019 | Kasuya |
| 2022/0132113 A1* | 4/2022 | Paluri ............... H04N 19/70 |
| 2022/0256201 A1* | 8/2022 | Chen ................. H04N 19/82 |

OTHER PUBLICATIONS

Document: JVET-N1001-v1, Bross, B., et al., "Versatile Video Coding(Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, 343 pages.

Suehring, K., et al., "AHG17: High-level syntax cleanup", Joint Video Experts Team (JVET) of ITU-T SG 16 WP 3 and ISO/IEC JTC 1/SC 29/WG 11, 15th Meeting: Gothenburg, SE, Jul. 3-12, 2019, 6 pages.

Document: JVET-N1001-v8, Bross, B., et al., "Versatile Video Coding (Draft 5)", Joint Video Experts Team (JVET) of ITU-T SG 16 WP 3 and ISO/IEC JTC 1/SC 29/WG 11,14th Meeting: Geneva, CH, Mar. 19-27, 2019, 400 pages.

Document: JVET-O2001-vE, Bross, B., et al., "Versatile Video Coding (Draft 6)", Joint Video Experts Team (JVET) of ITU-T SG 16 WP 3 and ISO/IEC JTC 1/SC 29/WG 11, 15th Meeting: Gothenburg, SE, Jul. 3-12, 2019, 455 pages.

"Advanced Video Coding for Generic Audiovisual Services," Series H: Audiovisual and Multimedia Systems Infrastructure of Audiovisual Services—Coding of Moving Video, ITU-T H.264, Jun. 2019, 836 pages.

"High Efficiency Video Coding," Series H: Audiovisual and Multimedia Systems Infrastructure of Audiovisual Services—Coding of Moving Video, ITU-T H.265, Feb. 2018, 692 pages.

"Line Transmission of Non-Telephone Signals, Video Codec for Audiovisual Services at p x 64 kbits," ITU-T Recommendation H.261, Mar. 1993, 29 pages.

"Transmission of Non-Telephone Signals, Information Technology—Generic Coding of Moving Pictures and Associated Audio Information: Video," ITU-T H.262, Jul. 1995, 211 pages.

"Video Coding for Low Bit Rate Communication," Series H: Audiovisual and Multimedia Systems Infrastructure of Audiovisual Services—Coding of Moving Video, ITU-T H.263, Jan. 2005, 226 pages.

Bross, et al., "Versatile Video Coding (Draft 6)," Joint Video Experts Team (JVET) of ITU-T SG 16 WP 3 and ISO/IEC ITC 1/SC 29/WG 11, Document JVET-O2001-vE, 15th Meeting: Gothenburg, SE, Jul. 3-12, 2019, 455 pages.

Sullivan, et al., "Meeting Report of the 15th Meeting of the Joint Video Experts Team (JVET)," Joint Video Experts Team (JVET) of ITU-T SG 16 WP 3 and ISO/IEC JTC 1/SC 29/WG 11, 15th Meeting : Gothenburg, SE, Jul. 3-12, 2019, Document JVET-O2000, 409 pages.

* cited by examiner

ALF APS CONSTRAINTS IN VIDEO CODING

CROSS-REFERENCE TO RELATED APPLICATIONS

This patent application is a continuation of International Application No. PCT/US2020/041666, filed Jul. 10, 2020 by Jianle Chen, et. al., and titled "ALF APS Constraints In Video Coding," which claims the benefit of U.S. Provisional Patent Application No. 62/888,267, filed Aug. 16, 2019 by Jianle Chen, et al., and titled "Constraints For ALF APS," which are hereby incorporated by reference.

TECHNICAL FIELD

The present disclosure is generally related to video coding, and is specifically related to efficient signaling of coding tool parameters used to compress video data in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in a decoder, the method comprising: receiving, by a receiver of the decoder, a bitstream comprising an adaptive loop filter (ALF) adaptation parameter set (APS) including an ALF luma filter signal flag (alf_luma_filter_signal_flag) and a ALF chroma filter signal flag (alf_chroma_filter_signal_flag), wherein at least one of the alf_luma_filter_signal_flag or the alf_chroma_filter_signal_flag is equal to one; and decoding, by a processor of the decoder, a slice based on ALF parameters in the ALF APS.

An APS may be used to maintain data that relates to multiple slices, but not to an entire picture. An APS may contain ALF parameters. The ALF parameters may control the application of an ALF process to only luma components in a slice, only chroma components in the slice, or both luma components and chroma components in the slice. An ALF APS may contain flags indicating the type of data contained in the APS. However, the flag based signaling related to the ALF APS is inefficient in some video coding systems. For example, the flags can be set to indicate that ALF APS contains only a luma filter set, only a chroma filter set, both a luma filter set and a chroma set, or neither a luma filter set nor a chroma filter set. An ALF APS that contains neither luma nor chroma filter sets is not useful. However, a standardized codec should be built to support any option allowed by the standard. As such, allowing an ALF APS that contains neither luma nor chroma filter sets results in an inefficient codec design that should support an option that should not occur. The present examples apply constraints to increase the efficiency of ALF APS signaling and resulting codec designs. For example, the ALF APS is constrained so that one or both of an ALF luma filter signal flag and an ALF chroma filter signal flag in the ALF APS is set to one. This ensures the ALF APS includes at least a luma filter set or chroma filter set, and is hence not empty. As another example, a slice header associated with a slice may contain a luma component ALF APS ID that indicates an ALF APS contains a relevant luma filter set. When this occurs, a constraint may be employed that the ALF luma filter signal flag in the ALF APS is set to one. This ensures that the ALF APS contains luma data when a slice header refers to the ALF APS in relation to luma data. As another example, a slice header associated with a slice may contain a chroma component ALF APS ID that indicates an ALF APS contains a relevant chroma filter set. When this occurs, a constraint may be employed that the ALF chroma filter signal flag in the ALF APS is set to one. This ensures that the ALF APS contains chroma data when a slice header refers to the ALF APS in relation to chroma data. These constraints may ensure that needless ALF APS signaling is avoided and that the ALF APS contains data as needed to filter decoded slices. Such constraints may be checked by a hypothetical reference decoder (HRD) at an encoder. The HRD can check an encoded bitstream for standards conformance to ensure that these problem cases do not occur. Hence, these constraints allow a decoder to presume such problem cases have not occurred in the bitstream. Therefore, the decoder can be simplified to avoid supporting such problem cases. Accordingly, the present constraints prevent errors, increase coding efficiency, and/or reduce complexity of the encoder and/or decoder. As such, the present examples may increase video coding system functionality while reducing the usage of network resources, memory resources, and/or processing resources at the encoder and/or the decoder.

Optionally, in any of the preceding aspects, another implementation of the aspect provides, wherein the alf_luma_filter_signal_flag specifies whether a luma filter set is signaled in the ALF APS.

Optionally, in any of the preceding aspects, another implementation of the aspect provides, wherein a value of the alf_luma_filter_signal_flag of the ALF APS is constrained to be equal to one when a luma component ALF APS identifier (ID) in a slice header (slice_alf_aps_id_luma[i]) associated with the slice is equal to an APS ID of the ALF APS.

Optionally, in any of the preceding aspects, another implementation of the aspect provides, wherein the slice_alf_aps_id_luma[i] specifies an APS ID (adaptation_parameter_set_id) of an i-th ALF APS referred to by a luma component of the slice.

Optionally, in any of the preceding aspects, another implementation of the aspect provides, wherein the alf_chroma_filter_signal_flag specifies whether a chroma filter set is signaled in the ALF APS.

Optionally, in any of the preceding aspects, another implementation of the aspect provides, wherein a value of the alf_chroma_filter_signal_flag of the ALF APS is constrained to be equal to one when a chroma component ALF APS ID in a slice header associated with the slice (slice_alf_aps_id_chroma) is equal to the APS ID of the ALF APS.

Optionally, in any of the preceding aspects, another implementation of the aspect provides, wherein the slice_alf_aps_id_chroma specifies an adaptation_parameter_set_id of the ALF APS referred to by a chroma component of the slice.

In an embodiment, the disclosure includes a method implemented in an encoder, the method comprising: encoding, by a processor of the encoder, a slice into a bitstream as part of an encoded video sequence; determining, by the processor, ALF parameters for application to the slice; encoding, by the processor, the ALF parameters into an a ALF adaptation parameter set (APS) in the bitstream, the ALF APS including an ALF luma filter signal flag (alf_luma_filter_signal_flag) and a ALF chroma filter signal flag (alf_chroma_filter_signal_flag), wherein at least one of the alf_luma_filter_signal_flag or the alf_chroma_filter_signal_flag is equal to one; and storing, by a memory coupled to the processor, the bitstream for communication toward a decoder.

An APS may be used to maintain data that relates to multiple slices, but not to an entire picture. An APS may contain ALF parameters. The ALF parameters may control the application of an ALF process to only luma components in a slice, only chroma components in the slice, or both luma components and chroma components in the slice. An ALF APS may contain flags indicating the type of data contained in the APS. However, the flag based signaling related to the ALF APS is inefficient in some video coding systems. For example, the flags can be set to indicate that ALF APS contains only a luma filter set, only a chroma filter set, both a luma filter set and a chroma set, or neither a luma filter set nor a chroma filter set. An ALF APS that contains neither luma nor chroma filter sets is not useful. However, a standardized codec should be built to support any option allowed by the standard. As such, allowing an ALF APS that contains neither luma nor chroma filter sets results in an inefficient codec design that should support an option that should not occur. The present examples apply constraints to increase the efficiency of ALF APS signaling and resulting codec designs. For example, the ALF APS is constrained so that one or both of an ALF luma filter signal flag and an ALF chroma filter signal flag in the ALF APS is set to one. This ensures the ALF APS includes at least a luma filter set or chroma filter set, and is hence not empty. As another example, a slice header associated with a slice may contain a luma component ALF APS ID that indicates an ALF APS contains a relevant luma filter set. When this occurs, a constraint may be employed that the ALF luma filter signal flag in the ALF APS is set to one. This ensures that the ALF APS contains luma data when a slice header refers to the ALF APS in relation to luma data. As another example, a slice header associated with a slice may contain a chroma component ALF APS ID that indicates an ALF APS contains a relevant chroma filter set. When this occurs, a constraint may be employed that the ALF chroma filter signal flag in the ALF APS is set to one. This ensures that the ALF APS contains chroma data when a slice header refers to the ALF APS in relation to chroma data. These constraints may ensure that needless ALF APS signaling is avoided and that the ALF APS contains data as needed to filter decoded slices. Such constraints may be checked by a hypothetical reference decoder (HRD) at an encoder. The HRD can check an encoded bitstream for standards conformance to ensure that these problem cases do not occur. Hence, these constraints allow a decoder to presume such problem cases have not occurred in the bitstream. Therefore, the decoder can be simplified to avoid supporting such problem cases. Accordingly, the present constraints prevent errors, increase coding efficiency, and/or reduce complexity of the encoder and/or decoder. As such, the present examples may increase video coding system functionality while reducing the usage of network resources, memory resources, and/or processing resources at the encoder and/or the decoder.

Optionally, in any of the preceding aspects, another implementation of the aspect provides, wherein the alf_luma_filter_signal_flag specifies whether a luma filter set is signaled in the ALF APS.

Optionally, in any of the preceding aspects, another implementation of the aspect provides, wherein a value of the alf_luma_filter_signal_flag of the ALF APS is constrained to be equal to one when a luma component ALF APS ID in a slice header (slice_alf_aps_id_luma[i]) associated with the slice is equal to an APS ID of the ALF APS.

Optionally, in any of the preceding aspects, another implementation of the aspect provides, wherein the slice_alf_aps_id_luma[i] specifies an adaptation_parameter_set_id of an i-th ALF APS referred to by a luma component of the slice.

Optionally, in any of the preceding aspects, another implementation of the aspect provides, wherein the alf_chroma_filter_signal_flag specifies whether a chroma filter set is signaled in the ALF APS.

Optionally, in any of the preceding aspects, another implementation of the aspect provides, wherein a value of the alf_chroma_filter_signal_flag of the ALF APS is constrained to be equal to one when a chroma component ALF APS ID in a slice header associated with the slice (slice_alf_aps_id_chroma) is equal to the APS ID of the ALF APS.

Optionally, in any of the preceding aspects, another implementation of the aspect provides, wherein the slice_alf_aps_id_chroma specifies an adaptation_parameter_set_id of the ALF APS referred to by a chroma component of the slice.

In an embodiment, the disclosure includes a video coding device comprising: a processor, a receiver coupled to the processor, a memory coupled to the processor, and a transmitter coupled to the processor, wherein the processor, receiver, memory, and transmitter are configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a decoder comprising: a receiving means for receiving a bitstream comprising an adaptive loop filter (ALF) adaptation parameter set (APS) including an ALF luma filter signal flag (alf_luma_filter_signal_flag) and a ALF chroma filter signal flag (alf_chroma_filter_signal_flag), wherein at least one of the alf_luma_filter_signal_flag or the alf_chroma_filter_signal_flag is equal to one; and a forwarding means for forwarding the slice for display as part of a decoded video sequence.

Optionally, in any of the preceding aspects, another implementation of the aspect provides, wherein the decoder is further configured to perform the method of any of the preceding aspects.

In an embodiment, the disclosure includes an encoder comprising: a slice encoding means for encoding a slice into a bitstream as part of an encoded video sequence; a determining means for determining ALF parameters for application to the slice; an ALF encoding means for encoding the ALF parameters into an a ALF adaptation parameter set (APS) in the bitstream, the ALF APS including an ALF luma filter signal flag (alf_luma_filter_signal_flag) and a ALF chroma filter signal flag(alf_chroma_filter_signal_flag), wherein at least one of the alf_luma_filter_signal_flag or the alf_chroma_filter_signal_flag is equal to one; and a storing means for storing the bitstream for communication toward a decoder.

Optionally, in any of the preceding aspects, another implementation of the aspect provides, wherein the encoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
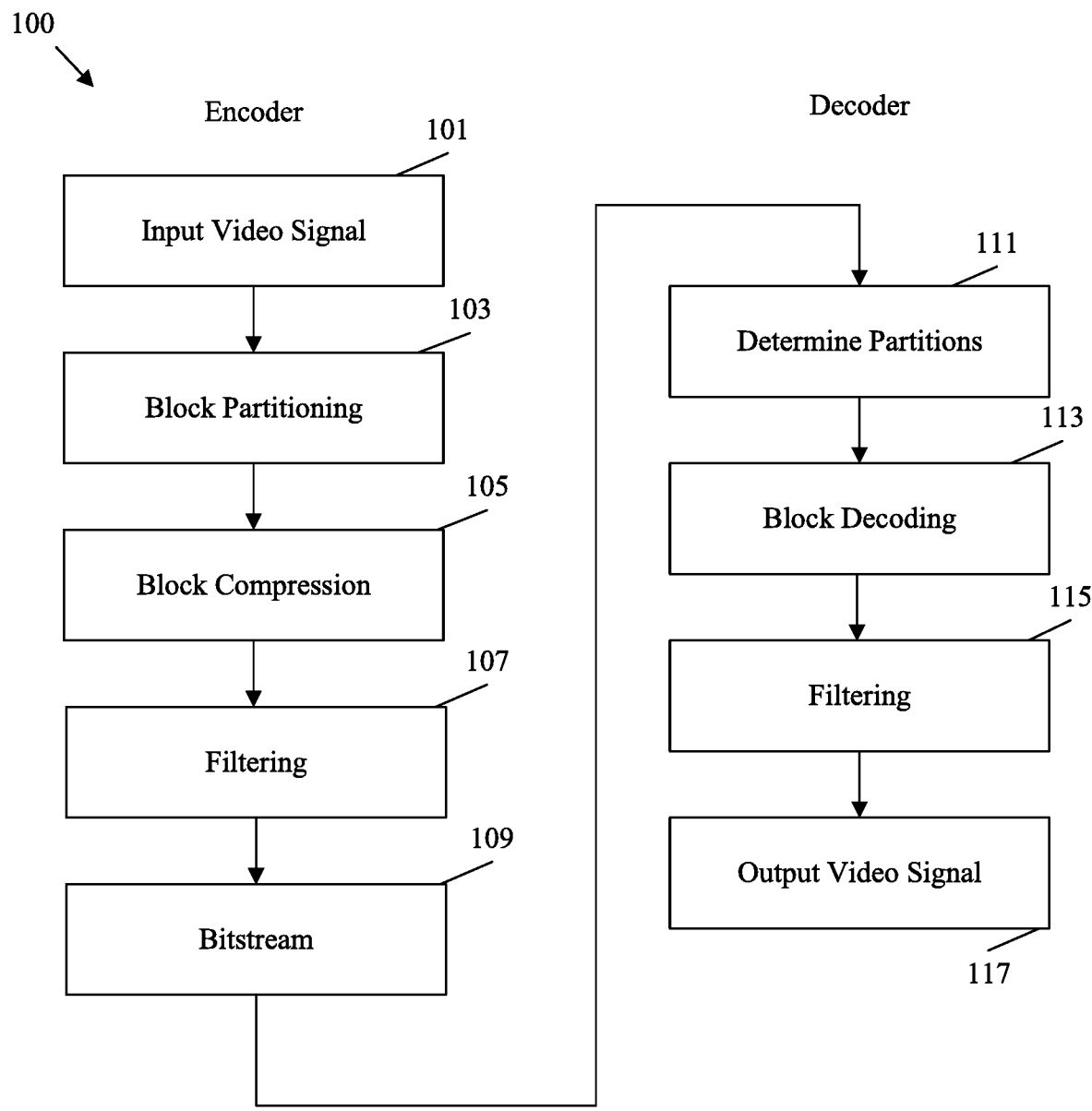
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit in any other definitions of descriptions provided for such terms herein.

A bitstream is a sequence of bits including video data that is compressed for transmission between an encoder and a decoder. An encoder is a device that is configured to employ encoding processes to compress video data into a bitstream. An encoded video sequence is a sequence of coded access units (AUs) and supporting syntax/parameters. An AU is a data unit that contains a complete set of video data relating to a single time instance (e.g., a single picture) in a video sequence. A decoder is a device that is configured to employ decoding processes to reconstruct video data from a bitstream for display. A decoded video sequence is a sequence of pictures that have been reconstructed by a decoder in preparation for display to a user. A picture is an array of luma samples and/or an array of chroma samples that create a frame or a field thereof. A picture that is being encoded or decoded can be referred to as a current picture for clarity of discussion. A slice is an integer number of complete tiles or an integer number of consecutive complete coding tree unit (CTU) rows within a tile of a picture that are exclusively contained in a single network abstraction layer (NAL) unit. A luma component, sometimes denoted as Y, is a portion of video data that depicts light. A chroma component is a portion of video data that depicts color and may be denoted as blue difference chroma (Cb) and red difference chroma (Cr). An adaptation parameter set (APS) is syntax structure containing syntax elements/parameters that apply to one or more slices in one or more pictures. An APS identifier (ID) is a value (e.g., an integer) that uniquely identifies an APS. An adaptive loop filter (ALF) is a filtering process applied as part of the decoding. For example, an ALF may employ a linear filter with a transfer function controlled by variable parameters and an optimization algorithm configured to adjust the variable parameters. An ALF APS is an APS that contains ALF parameters and controls the application of an ALF process to a corresponding slice. An ALF parameter is a syntax element that contains data related to control of an ALF process. An ALF luma filter signal flag is an ALF parameter that indicates a corresponding ALF APS contains a luma filter set. An ALF chroma filter signal flag is an ALF parameter that indicates a corresponding ALF APS contains a chroma filter set. A luma filter set is a set of filter parameters for controlling the application of an ALF to luma components in a slice. A chroma filter set is a set of filter parameters for controlling the application of an ALF to chroma components in a slice. A slice header is a part of a coded slice containing data elements pertaining to all video data in the slice. A luma component ALF APS ID is a syntax element in a slice header that identifies an ALF APS that contains a luma filter set related to a slice associated with the slice header. A chroma component ALF APS ID is a syntax element in a slice header that identifies an ALF APS that contains a chroma filter set related to a slice associated with the slice header.

The following acronyms are used herein, Adaptive Loop Filter (ALF), Adaptation Parameter Set (APS), Coding Tree Block (CTB), Coding Tree Unit (CTU), Coding Unit (CU), Coded Video Sequence (CVS), Decoded Picture Buffer (DPB), External Decoding Refresh (EDR), Group Of Pictures (GOP), Joint Video Experts Team (JVET), Motion-Constrained Tile Set (MCTS), Maximum Transfer Unit (MTU), Network Abstraction Layer (NAL), Picture Order Count (POC), Random Access Point (RAP), Raw Byte Sequence Payload (RBSP), Sample Adaptive Offset (SAO), Supplemental Enhancement Information (SEI), Sequence Parameter Set (SPS), Temporal Motion Vector Prediction (TMVP), Versatile Video Coding (VVC), and Working Draft (WD).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-O2001-v14.

An APS may be used to maintain data that relates to multiple slices, but not to an entire picture. In some examples, the same APS may contain data related to slices spread across multiple pictures (e.g., portions of multiple pictures). An APS may contain ALF parameters. The ALF parameters may control the application of an ALF process to only luma components in a slice, only chroma components in the slice, or both luma components and chroma components in the slice. An ALF APS may contain flags indicating the type of data contained in the APS. However, the flag based signaling related to the ALF APS may be inefficient in some video coding systems. For example, the flags can be set to indicate that ALF APS contains only a luma filter set, only a chroma filter set, both a luma filter set and a chroma set, or neither a luma filter set nor a chroma filter set. An ALF APS that contains neither luma nor chroma filter sets is not useful. However, a standardized codec should be built to support any option allowed by the standard. As such, allowing an ALF APS that contains neither luma nor chroma filter sets results in an inefficient codec design that should support an option that should not occur.

Disclosed herein are various mechanisms that apply constraints to increase the efficiency of ALF APS signaling and resulting codec designs. For example, the ALF APS may be constrained so that one or both of an ALF luma filter signal flag and an ALF chroma filter signal flag in the ALF APS is set to one. This ensures the ALF APS includes at least a luma filter set or chroma filter set, and is hence not empty. As another example, a slice header associated with a slice may contain a luma component ALF APS ID that indicates an ALF APS contains a relevant luma filter set. When this occurs, a constraint may be employed that the ALF luma filter signal flag in the ALF APS is set to one. This ensures that the ALF APS contains luma data when a slice header refers to the ALF APS in relation to luma data. As another example, a slice header associated with a slice may contain a chroma component ALF APS ID that indicates an ALF APS contains a relevant chroma filter set. When this occurs, a constraint may be employed that the ALF chroma filter signal flag in the ALF APS is set to one. This ensures that the ALF APS contains chroma data when a slice header refers to the ALF APS in relation to chroma data. These constraints may ensure that needless ALF APS signaling is avoided and that the ALF APS contains data as needed to filter decoded slices. Such constraints may be included in a hypothetical reference decoder (HRD) at an encoder. The HRD can check an encoded bitstream for standards conformance to ensure that these problem cases do not occur. Hence, these constraints allow a decoder to presume such problem cases have not occurred in the bitstream. Therefore, the decoder can be simplified to avoid supporting such problem cases. Accordingly, the present constraints prevent errors, increase coding efficiency, and/or reduce complexity of the encoder and/or decoder. As such, the present examples may increase video coding system functionality while reducing the usage of network resources, memory resources, and/or processing resources at the encoder and/or the decoder.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, deblocking filters, adaptive loop filters, and SAO filters may be applied to the frames to remove blocking artifacts. Once the frames are filtered, the video signal can be output to a display at step 117 for viewing by an end user.

Figure 2:
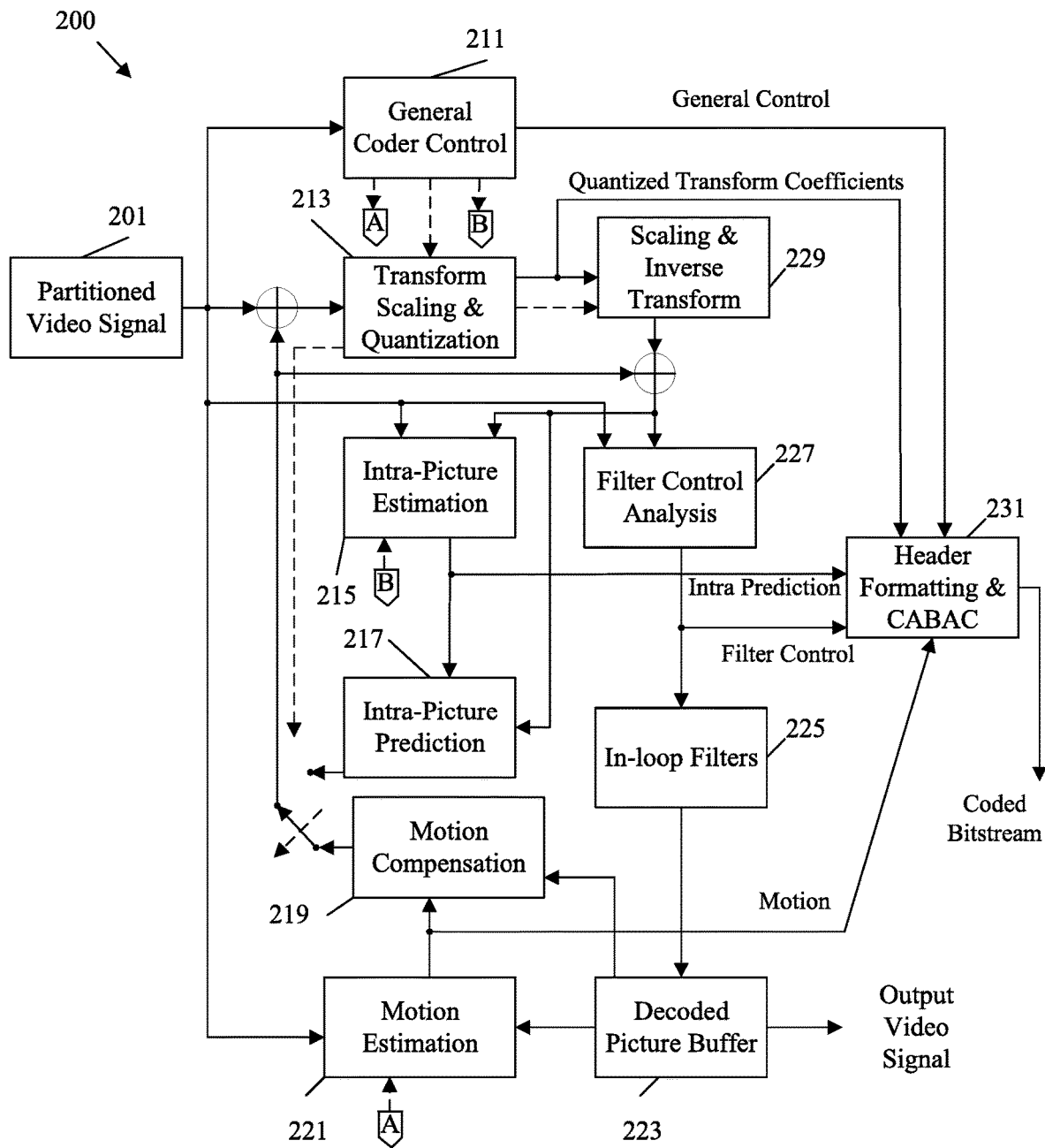
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
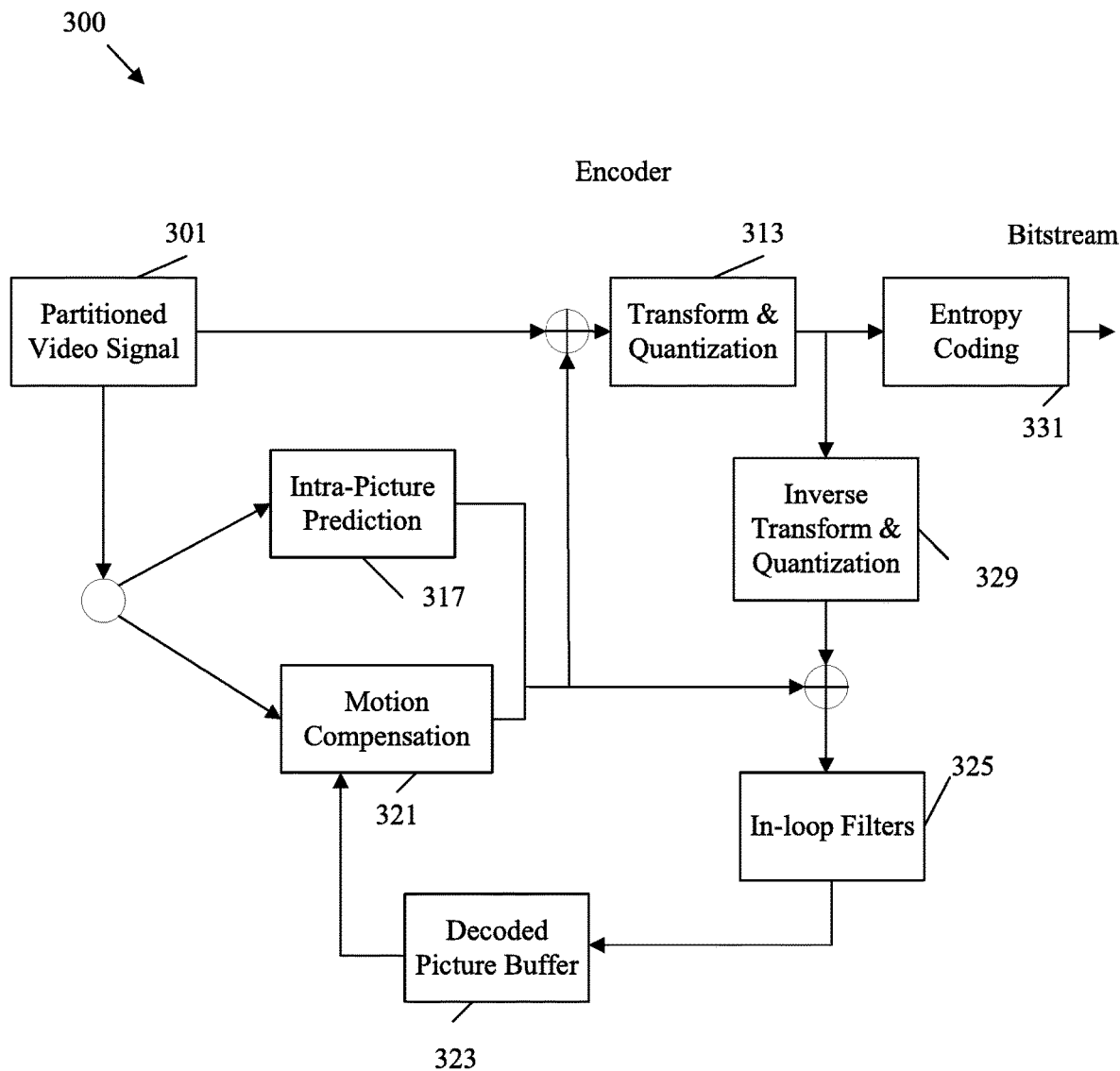
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
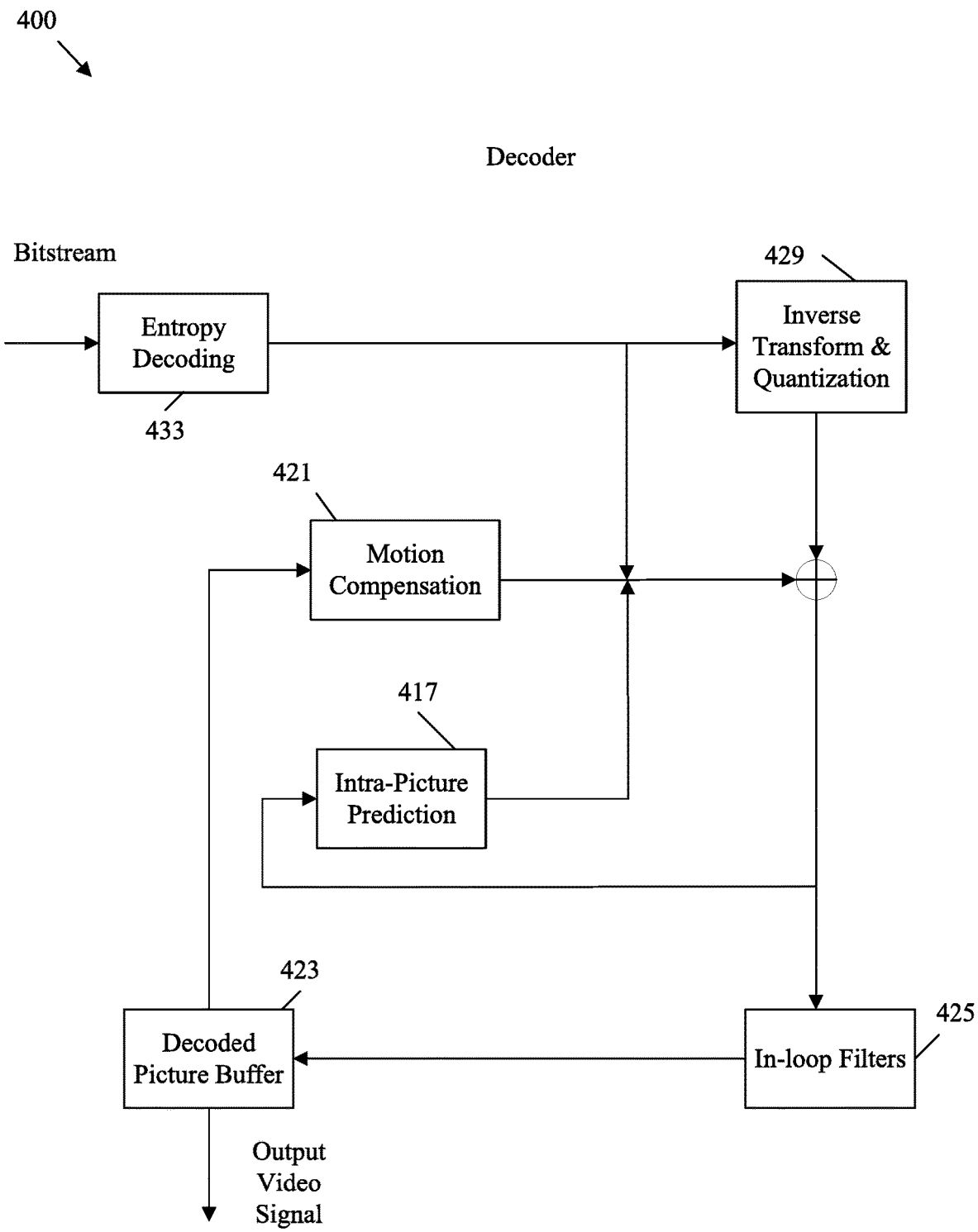
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
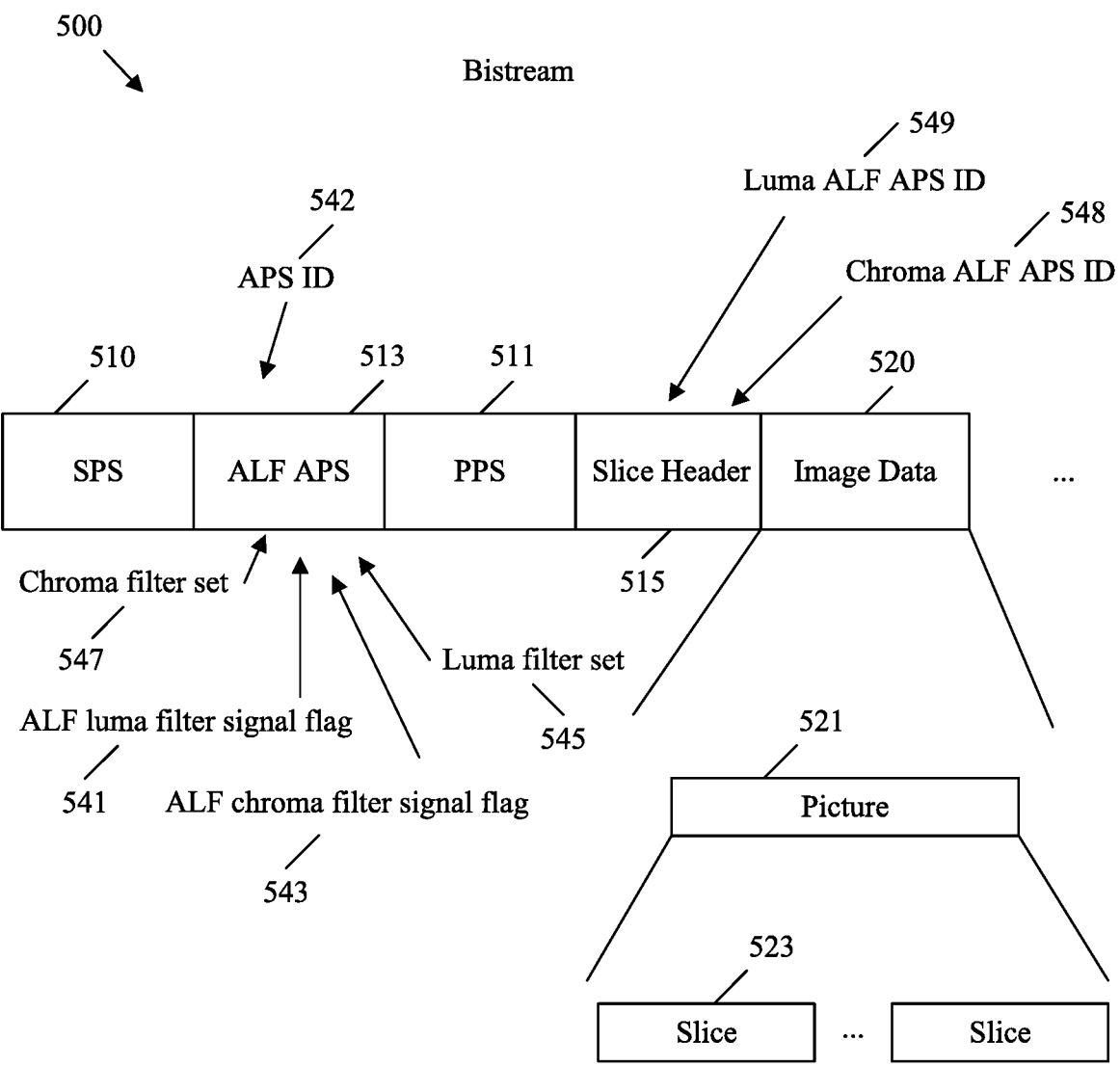
FIG. 5 is a schematic diagram illustrating an example bitstream containing an Adaptive Loop Filter (ALF) adaptation parameter sets (APSs) with parameter constraints.

FIG. 5 is a schematic diagram illustrating an example bitstream 500 containing an ALF APSs with parameter constraints. For example, the bitstream 500 can be generated by a codec system 200 and/or an encoder 300 for decoding by a codec system 200 and/or a decoder 400. As another example, the bitstream 500 may be generated by an encoder at step 109 of method 100 for use by a decoder at step 111.

The bitstream 500 includes a sequence parameter set (SPS) 510, an ALF APS 513, a plurality of picture parameter sets (PPSs) 511, a plurality of slice headers 515, and image data 520. An SPS 510 contains sequence data common to all the pictures 521 in the video sequence contained in the bitstream 500. Such data can include picture sizing, bit depth, coding tool parameters, bit rate restrictions, etc. The PPS 511 contains parameters that apply to an entire picture 521. Hence, each picture 521 in the video sequence may refer to a PPS 511. It should be noted that, while each picture 521 refers to a PPS 511, a single PPS 511 can contain data for multiple pictures 521 in some examples. For example, multiple similar pictures 521 may be coded according to similar parameters. In such a case, a single PPS 511 may contain data for such similar pictures 521. The PPS 511 can indicate coding tools available for slices 523 in corresponding pictures 521, quantization parameters, offsets, etc. The slice header 515 contains parameters that are specific to each slice 523 in a picture 521. Hence, there may be one slice header 515 per slice 523 in the video sequence. The slice header 515 may contain slice type information, picture order counts (POCs), reference picture lists, prediction weights, tile entry points, deblocking parameters, etc. It should be noted that a slice header 515 may also be referred to as a tile group header in some contexts. Further, a slice header 515 may reference a SPS 510, PPS 511, and/or ALF APS 513 for parameters that are used to code a corresponding slice 523.

The image data 520 contains video data encoded according to inter-prediction and/or intra-prediction as well as corresponding transformed and quantized residual data. For example, a video sequence includes a plurality of pictures 521 coded as image data. A picture 521 may be defined as an array of luma samples and/or an array of chroma samples that create a frame or a field thereof. A picture 521 is generally a single frame of a video sequence and hence is generally displayed as a single unit when displaying the video sequence. However, partial pictures 521 may be displayed to implement certain technologies such as virtual reality, picture in picture, etc. Further, some technologies may employ multiple layers of coded pictures 521, in which case a single picture 521 selected from one of a plurality of layers is displayed at a time instance. The pictures 521 may be identified by a corresponding POC. Further, the pictures 521 each reference a PPS 511.

The pictures 521 are divided into slices 523. In some systems the slices 523 are subdivided into tiles. In other systems, the slices 523 are referred to as tile groups containing the tiles. The slices 523 and/or tiles are further divided into coding tree units (CTUs). The CTUs are further divided into coding blocks based on coding trees. The coding blocks can then be encoded/decoded according to prediction mechanisms. A slice 523 may be a raster slice or a rectangular slice. For example, the picture 521 may be divided into columns and rows of CTUs. A raster slice 523 includes a group of CTUs of a picture 521, where the CTUs increase in raster scan order. A raster scan order increases from left to right along a row of CTUs and increases from top to bottom along columns of CTUs. A rectangular slice 523 may include any rectangular group of CTUs from the picture 521. As such, a slice 523 may be defined as integer number of complete tiles or an integer number of consecutive complete CTU rows within a tile of a picture that are exclusively contained in a single NAL unit. A NAL unit is data unit that is sized to be transmitted in a packet and that contains a type and data of the indicated type. The slices 523 and/or tile groups of tiles reference a slice header 515.

An APS is syntax structure containing syntax elements/parameters that apply to one or more slices 523 in one or more pictures 521. For example, an APS may apply to at least one, but less than all, slices 523 in a first picture 521, to at least one, but less than all, slices 523 in a second picture 521, etc. An APS can be separated into multiple types based on the parameters contained in the APS. An ALF APS 513 is an APS of type ALF that includes ALF parameters. An ALF is an adaptive block based filter that includes a transfer function controlled by variable parameters and employs feedback from a feedback loop to refine the transfer function. Further, the ALF is employed to correct coding artifacts (e.g., errors) that occur as a result of block based coding. The feedback loop may include an optimization algorithm, such as the RDO process operating at the encoder. As such, ALF parameters included in an ALF APS 513 may include variable parameters selected by the encoder to cause the filter to remove block based coding artifacts during decoding at the decoder.

Each APS, such as ALF APS 513, includes an APS ID 542. An APS ID 542 is any value, such as an integer, that uniquely identifies a corresponding APS. The APS ID 542 may be denoted as an adaptation_parameter_set_id in some examples. As noted above, an ALF APS 513 also contains ALF parameters. An ALF parameter is a syntax element that contains data related to control of an ALF process. ALF parameters may include an ALF luma filter signal flag 541, an ALF chroma filter signal flag 543, a luma filter set 545, and/or a chroma filter set 547.

Specifically, a slice 523 contains luma samples that display as light values and chroma samples that display as color values. A luma filter set 545 is a set of filter parameters for controlling the application of an ALF to luma components in a slice 523. A chroma filter set 547 is a set of filter parameters for controlling the application of an ALF to chroma components in a slice 523. An ALF APS 513 may contain a luma filter set 545, a chroma filter set 547, or both. For example, a first ALF APS 513 may contain both a luma filter set 545 and a chroma filter set 547. The luma components in the video may change, in which case a second ALF APS 513 may contain only an updated luma filter set 545. The chroma components in the video may then change, in which case a third ALF APS 513 may contain only an updated chroma filter set 547. Flags can be used to indicate the type of filter components contained in an ALF APS 513. An ALF luma filter signal flag 541 is an ALF parameter that indicates a corresponding ALF APS 513 contains a luma filter set 545. The ALF luma filter signal flag 541 may be denoted as an alf_luma_filter_signal_flag in some examples. An ALF chroma filter signal flag 543 is an ALF parameter that indicates a corresponding ALF APS 513 contains a chroma filter set 547. The ALF chroma filter signal flag 543 may be denoted as a alf_chroma_filter_signal_flag in some examples.

The slice header 515 may reference the ALF APS(s) 513 that contain the ALF parameters for a corresponding slice 523. For example, the slice header 515 may contain a luma component ALF APS ID 549 and a chroma component ALF APS ID 548. A luma component ALF APS ID 549 is a syntax element in a slice header 515 that identifies an ALF APS 513 that contains a luma filter set 545 related to a slice 523 associated with the slice header 515. The luma component ALF APS ID 549 may be denoted as slice_alf_aps_id_luma [i] in some examples, where i indicates an ith ALF APS 513 and i is any positive integer. A chroma component ALF APS ID 548 is a syntax element in a slice header 515 that identifies an ALF APS 513 that contains a chroma filter set 547 related to a slice 523 associated with the slice header 515. A chroma component ALF APS ID 548 may be denoted as slice_alf_aps_id_chroma is some examples. For example, the luma component ALF APS ID 549 and the chroma component ALF APS ID 548 may reference the ALF APS 513 by employing the APS ID 542.

Bitstream 500 includes certain constraints to increase coding efficiency, reduce errors, and/or support equipment simplification. For example, the ALF APS 513 may contain a luma filter set 545, a chroma filter set 547, or both. However, the ALF APS 513 should contain at least one filter set. Accordingly, the bitstream 500 includes a constraint that at least one of the ALF luma filter signal flag 541 and the ALF chroma filter signal flag 543 in a single ALF APS 513 is set to one. This constraint ensures that no ALF APS 513 is transmitted to a decoder without at least one filter set. Further, this allows the decoder to ignore the possibility that the ALF APS 513 contains no filter sets. Hence, the decoder design can be simplified and hardware resources can instead be allocated to other tasks.

As another example, the ALF APS 513 can be constrained so that when a luma component ALF APS ID 549 indicates the APS ID 542, the corresponding ALF APS 513 contains a luma filter set 545. Further, when this occurs, the ALF luma filter signal flag 541 in the indicated ALF APS 513 is set to one. This ensures that the ALF APS 513 contains the luma filter parameters used to decode the slice 523 associated with the slice header 515. As such, a decoder can be simplified by ignoring the possibility that luma filter parameters are improperly referenced by the slice header 515.

As another example, the ALF APS 513 can be constrained so that when a chroma component ALF APS ID 548 indicates the APS ID 542, the corresponding ALF APS 513 contains a chroma filter set 547. Further, when this occurs, the ALF chroma filter signal flag 543 in the indicated ALF APS 513 is set to one. This ensures that the ALF APS 513 contains the chroma filter parameters used to decode the slice 523 associated with the slice header 515. As such, a decoder can be simplified by ignoring the possibility that chroma filter parameters are improperly referenced by the slice header 515.

These constraints may ensure that needless ALF APS 513 signaling is avoided and that the ALF APS 513 contains data as needed to filter decoded slices 523. Such constraints may be implemented in a HRD at an encoder. The HRD can check the bitstream 500 for standards conformance to ensure that the ALF APS 513 contains at least one filter set and never contains the wrong filter set to decode a corresponding slice 523. Hence, these constraints allow a decoder to presume such problems have not occurred in the bitstream 500. Therefore, the decoder can be simplified to avoid the need to check for, and intelligently respond to, such issues. Accordingly, the present constraints prevent errors, increase coding efficiency, and/or reduce complexity of the encoder and/or decoder. As such, the present examples may increase video coding system functionality while reducing the usage of network resources, memory resources, and/or processing resources at the encoder and/or the decoder.

The preceding information is now described in more detail herein below. In HEVC, instantaneous decoding refresh (IDR), Broken Link Access (BLA), and Clean Random Access (CRA) pictures are intra random access point (IRAP) pictures. VVC employs IDR and CRA pictures as IRAP pictures. An IRAP picture is coded according to intra-prediction, and hence is not coded in reference to another picture. An IRAP picture provides the following functionalities/benefits. The presence of an IRAP picture indicates that a decoding process can start from that picture. This functionality supports a random access feature that allows a decoding process to start at a position in a bitstream as long as an IRAP picture is present at that position. The position may not be at the beginning of a bitstream. The presence of an IRAP picture may also refresh the decoding process such that coded pictures after IRAP picture, excluding random access skipped leading (RASL) pictures, are coded without any reference to pictures preceding the IRAP picture. Hence, an IRAP picture prevents errors occurring prior to the IRAP picture from propagating to pictures that follow the IRAP picture in decoding order.

IRAP pictures provide the above-mentioned functionalities, but result in a penalty to compression efficiency. The presence of an IRAP picture also causes a surge in bit-rate. This penalty to the compression efficiency has two causes. First, as an IRAP picture is an intra-predicted picture, and hence the IRAP picture is represented by more bits than inter-predicted pictures. Second, the presence of an IRAP picture may break temporal prediction by refreshing the decoding process when reference pictures are removed from the DPB. This may result in less efficient coding of pictures that follow the IRAP picture as fewer reference pictures are available for inter-prediction.

IDR pictures in HEVC may be derived and signaled differently from other picture types. Some of the differences are as follows. When signaling and deriving a POC value of an IDR picture, the most significant bit (MSB) of the POC may be set equal to zero instead of being derived from a previous key picture. Further, a slice header of an IDR picture may not contain information to assist in reference picture management. For other picture types, such as CRA and trailing, reference picture sets (RPSs) or reference picture lists may be employed for a reference pictures marking process. This process is employed to determine the status of reference pictures in the DPB as either used for reference or unused for reference. For IDR pictures such information may not be signaled because the presence of IDR indicates that the decoding process should mark all reference pictures in the DPB as unused for reference.

Leading pictures, when present, are associated with an IRAP picture. Leading pictures are pictures that follow an associated IRAP picture in decoding order but precede the IRAP picture in presentation/output order. Depending on the coding configuration and picture referencing structure, leading pictures are further identified into two types. The first type is the leading pictures that may not be decoded correctly when the decoding process starts at an associated IRAP picture. Such pictures are known as RASL pictures. RASL pictures may not be decodable in this case because RASL pictures are coded with reference to pictures that precede the IRAP picture in decoding order. The second type is a leading picture that can be decoded correctly even when the decoding process starts at an associated IRAP picture. These pictures are known as random access decodable leading (RADL) pictures. RADL pictures can be decoded because RADL pictures are coded without referencing, directly or indirectly, pictures that precede the IRAP picture in decoding order. HEVC systems employ constraints such that RASL pictures should precede RADL pictures in output order when the RASL and RADL pictures are associated with the same IRAP picture.

IRAP pictures and leading pictures are assigned different NAL unit types to support identification by system level applications. For example, a video splicer may be configured to determine coded picture types without reviewing detailed syntax elements in the coded bitstream. For example, a video splicer may identify IRAP pictures from non-IRAP pictures and identify leading pictures, including determining RASL and RADL pictures, from trailing pictures. Trailing pictures are pictures that are associated with an IRAP picture and follow the IRAP picture in output order. A picture is associated with a particular IRAP picture when the picture follows the particular IRAP picture in decoding order and precedes any other IRAP picture in decoding order. Accordingly, assigning IRAP and leading pictures distinct NAL unit types support such applications.

VVC systems may employ an APS. An APS is a syntax element that contains parameters and/or data that may be referred to by one or more slices. Parameters that are contained in an APS may be shared among slices in one or more pictures. APS parameters may be updated more frequently than PPS parameters and/or SPS parameters.

The following table describes example APS syntax. APS may contain parameters for ALF, luma mapping with chroma scaling (LMCS), and scaling list. Each APS may contain only one type of parameter, which is specified by aps_params_type. An APS that contains one or more ALF parameters, LMCS parameters, or scaling list parameters may be referred to as an ALF APS, LMCS APS, or Scaling APS, respectively.

|  | Descriptor |
|---|---|
| adaptation_parameter_set_rbsp( ) { |  |
|   adaptation_parameter_set_id | u (5) |
|   aps_params_type | u (3) |
|   if( aps_params_type = = ALF_APS ) |  |
|     alf_data( ) |  |
|   else if( aps_params_type = = LMCS_APS ) |  |
|     lmcs_data( ) |  |
|   else if( aps_params_type = = SCALING_APS ) |  |
|     scaling_list_data( ) |  |
|   aps_extension_flag | u (1) |
|   if( aps_extension_flag ) |  |
|     while( more_rbsp_data( ) ) |  |
|       aps_extension_data_flag | u (1) |
|   rbsp_trailing_bits( ) |  |
| } |  |

The following table describes example ALF parameter syntax as alf_data( ). The ALF parameters may be parameters used for luma components only, chroma components only, or both luma and chroma components, depending on the example. The presence of parameters for luma and chroma components is specified by an alf_luma_filter_signal_flag and a alf_chroma_filter_signal_flag.

|  | Descriptor |
|---|---|
| alf_data( ) { |  |
|   alf_luma_filter_signal_flag | u (1) |
|   alf_chroma_filter_signal_flag | u (1) |
|   if( alf_luma_filter_signal_flag ) { |  |
|     alf_luma_clip_flag | u (1) |
|     alf_luma_num_filters_signalled_minus1 | ue (v) |
|     if( alf_luma_num_filters_signalled_minus1 > 0 ) { |  |
|       for( filtIdx = 0; filtIdx < NumAlfFilters; filtIdx++ ) |  |

| | Descriptor |
|---|---|
|         alf_luma_coeff_delta_idx[ filtIdx ]<br>    }<br>    alf_luma_coeff_signalled_flag<br>    if( alf_luma_coeff_signalled_flag ) {<br>        for( sfIdx = 0; sfIdx <= alf_luma_num_filters_signalled_minus1;<br>sfIdx++ )<br>            alf_luma_coeff_flag[ sfIdx ]<br>    }<br>    for( sfIdx = 0; sfIdx <= alf_luma_num_filters_signalled_minus1;<br>sfIdx++ ) {<br>        if( alf_luma_coeff_flag[ sfIdx ]) {<br>            for ( j = 0; j < 12; j++ ) {<br>                alf_luma_coeff_abs[ sfIdx ][ j ]<br>                if( alf_luma_coeff_abs[ sfIdx ][ j ] )<br>                    alf_luma_coeff_sign[ sfIdx ][ j ]<br>            }<br>        }<br>    }<br>    if( alf_luma_clip_flag ) {<br>        for( sfIdx = 0; sfIdx <= alf_luma_num_filters_signalled_minus1;<br>sfIdx++ ) {<br>            if( alf_luma_coeff_flag[ sfIdx ] ) {<br>                for ( j = 0; j < 12; j++ )<br>                    alf_luma_clip_idx[ sfIdx ][ j ]<br>            }<br>        }<br>    }<br>    if( alf_chroma_filter_signal_flag ) {<br>        alf_chroma_num_alt_filters_minus1<br>        for( altIdx = 0; altIdx <= alf_chroma_num_alt_filters_minus1;<br>altIdx++ ) {<br>            alf_chroma_clip_flag[ altIdx ]<br>            for( j = 0; j < 6; j++) {<br>                alf_chroma_coeff_abs[ altIdx ][ j ]<br>                if( alf_chroma_coeff_abs[ altIdx ][ j ] > 0 )<br>                    alf_chroma_coeff_sign[ altIdx ][ j ]<br>            }<br>            if( alf_chroma_clip_flag[ altIdx ] ) {<br>                for( j = 0; j < 6; j++ )<br>                    alf_chroma_clip_idx[ altIdx ][ j ]<br>            }<br>        }<br>    }<br>} | u (v)<br><br>u (1)<br><br><br><br>u (1)<br><br><br><br><br><br>uek (v)<br><br>u (1)<br><br><br><br><br><br><br><br><br>u (2)<br><br><br><br><br><br>ue (v)<br><br><br>u (1)<br><br>uek (v)<br><br>u (1)<br><br><br><br>u (2) |

When ALF is enabled for a slice, the slice refers to one or more APSs that contain the ALF parameters used for application of the ALF to the slice. A slice may refer to one or more ALF APSs for luma components and up to one ALF APS for chroma components. The following table includes an example slice header syntax describing the signaling of references to ALF APSs.

| | Descriptor |
|---|---|
| slice_header( ) {<br>   ...<br>   slice_alf_enabled_flag<br>   if( slice_alf_enabled_flag ) {<br>      slice_num_alf_aps_ids_luma<br>      for( i = 0; i < slice_num_alf_aps_ids_luma; i++ )<br>         slice_alf_aps_id_luma[ i ]<br>      if( ChromaArrayType != 0 )<br>         slice_alf_chroma_idc<br>      if( slice_alf_chroma_idc )<br>         slice_alf_aps_id_chroma<br>   }<br>   ...<br>} | <br><br>u (1)<br><br>u (3)<br><br>u (3)<br><br>u (2)<br><br>u (3) |

In an example, a slice_alf_enabled_flag may be set equal to one to specify that an adaptive loop filter is enabled and may be applied to luma (Y), blue difference chroma (Cb), or red difference chroma (Cr) color component in a slice. A slice_alf_enabled_flag may be set equal to zero to specify that adaptive loop filter is disabled for all color components in a slice. A slice_num_alf_aps_ids_luma may specify the number of ALF APSs that the slice refers to. The value of slice_num_alf_aps_ids_luma may be in the range of zero to seven, inclusive. A slice_alf_aps_id_luma[i] may specify the adaptation_parameter_set_id of the i-th ALF APS that the luma component of the slice refers to. The TemporalId of the APS NAL unit having aps_params_type equal to ALF_APS and adaptation_parameter_set_id equal to slice_alf_aps_id_luma[i] should be less than or equal to the TemporalId of the coded slice NAL unit. For intra slices and slices in an IRAP picture, slice_alf_aps_id_luma[i] may not refer to an ALF APS associated with other pictures rather than the picture containing the intra slices or the IRAP picture. A slice_alf_chroma_idc may be set equal to zero to specify that the adaptive loop filter is not applied to Cb and Cr color components. A slice_alf_chroma_idc may be set equal to one to indicate that the adaptive loop filter is applied to the Cb color component. The slice_alf_chroma_idc may be set equal to two to indicate that the adaptive loop filter is applied to the Cr color component. The slice_alf_chroma_idc may be set equal to three to indicate that the adaptive loop filter is applied to Cb and Cr color components. The slice_alf_chroma_idc may be inferred to be equal to zero when not present. A slice_alf_aps_id_chroma specifies the adaptation_parameter_set_id of the ALF APS that the chroma component of the slice refers to. The TemporalId of the APS NAL unit having aps_params_type equal to ALF_APS and adaptation_parameter_set_id equal to slice_alf_aps_id_chroma should be less than or equal to the TemporalId of the coded slice NAL unit. For intra slices and slices in an IRAP picture, slice_alf_aps_id_chroma should not refer to an ALF APS associated with other pictures rather than the picture containing the intra slices or the IRAP picture.

The preceding example implementation has certain problems. For example, the type of ALF parameters signaled in an APS is specified by two flags, denoted as the alf_luma_filter_signal_flag and the alf_chroma_filter_signal_flag. The values of these two flags may result in four possibilities as follows: both flags have a zero value; alf_luma_filter_signal_flag is equal to one and alf_chroma_filter_signal_flag is equal to zero; alf_luma_filter_signal_flag is equal to zero and alf_chroma_filter_signal_flag is equal to one; and both flags have a one value. Out of these four possibilities, the signaling of an ALF APS is redundant when values of both of the flags are equal to zero. Further, an ALF APS can be referred to by a slice for parameters related to luma components, for example by using a syntax element slice_alf_aps_id_luma[i]. However, the ALF APS is not required to contain ALF parameters for luma components, for example when the value of alf_luma_filter_signal_flag is equal to zero. The same issue can occur for chroma components as.

In general, this disclosure describes some constraints to methods of signaling ALF parameters in an APS. The ALF parameters may include parameters for luma components and/or chroma components. The description of the techniques used herein is based on the VVC standard, but may also apply to other video codec specifications. An example mechanism to address the problems listed above is as follows. A constraint can be employed such that ALF APS should contain an ALF parameter for at least one type of color component (e.g., luma or chroma). Further, a constraint may be applied such that when an ALF APS is referred to by a slice for ALF parameters related to a luma component, the ALF APS should contain an ALF parameter for the luma component. In addition, a constraint may be applied such that when an ALF APS is referred to by a slice for ALF parameters related to a chroma component, the ALF APS should contain an ALF parameter for the chroma component.

The following is an example implementation. An example ALF data semantics are as follows. An alf_luma_filter_signal_flag may be set equal to one to specify that a luma filter set is signaled. The alf_luma_filter_signal_flag may be set equal to zero to specify that a luma filter set is not signaled. An alf_chroma_filter_signal_flag may be set equal to one to specify that a chroma filter is signaled. The alf_chroma_filter_signal_flag may be set equal to zero to specify that a chroma filter is not signaled. When ChromaArrayType is equal to zero, alf_chroma_filter_signal_flag should also be equal to zero. Bitstream conformance may require that the values of alf_luma_filter_signal_flag and alf_chroma_filter_signal_flag should not both be equal to zero. The variable NumAlfFilters specifying the number of different adaptive loop filters may be set equal to twenty five.

An example slice header semantics are as follows. A slice_alf_enabled_flag may be set equal to one to specify that an adaptive loop filter is enabled and may be applied to Y, Cb, or Cr color components in a slice. The slice_alf_enabled_flag may be set equal to zero to specify that the adaptive loop filter is disabled for all color components in a slice. The slice_num_alf_aps_ids_luma may specify the number of ALF APSs referred to by the slice. The value of slice_num_alf_aps_ids_luma may be in the range of zero to seven, inclusive. The slice_alf_aps_id_luma[i] may specify the adaptation_parameter_set_id of the i-th ALF APS referred to by the luma component of the slice. The TemporalId of the APS NAL unit having aps_params_type equal to ALF_APS and adaptation_parameter_set_id equal to slice_alf_aps_id_luma[i] should be less than or equal to the TemporalId of the coded slice NAL unit. For intra slices and slices in an IRAP picture, slice_alf_aps_id_luma[i] should not refer to an ALF APS associated with any other picture that is not the picture containing the intra slices or the IRAP picture. The value of alf_luma_filter_signal_flag of the APS NAL unit having aps_params_type equal to ALF_APS and adaptation_parameter_set_id equal to slice_alf_aps_id_luma[i] should be equal to one.

A slice_alf_chroma_idc may be set equal to zero to specify that the adaptive loop filter is not applied to Cb and Cr color components. The slice_alf_chroma_idc may be set equal to one to indicate that the adaptive loop filter is applied to the Cb color component. The slice_alf_chroma_idc may be set equal to two to indicate that the adaptive loop filter is applied to the Cr color component. The slice_alf_chroma_idc may be set equal to three to indicate that the adaptive loop filter is applied to Cb and Cr color components. The slice_alf_chroma_idc can be inferred to be equal to zero when not present. The slice_alf_aps_id_chroma specifies the adaptation_parameter_set_id of the ALF APS referred to by the chroma component of the slice. The TemporalId of the APS NAL unit having aps_params_type equal to ALF_APS and adaptation_parameter_set_id equal to slice_alf_aps_id_chroma shall be less than or equal to the TemporalId of the coded slice NAL unit. For intra slices and slices in an IRAP picture, slice_alf_aps_id_chroma should not refer to an ALF APS associated with any other picture that is not the picture containing the intra slices or the IRAP picture. The value of the alf_chroma_filter_signal_flag of the APS NAL unit having aps_params_type equal to ALF_APS and the adaptation_parameter_set_id equal to slice_alf_aps_id_chroma should be equal to one.

Figure 6:
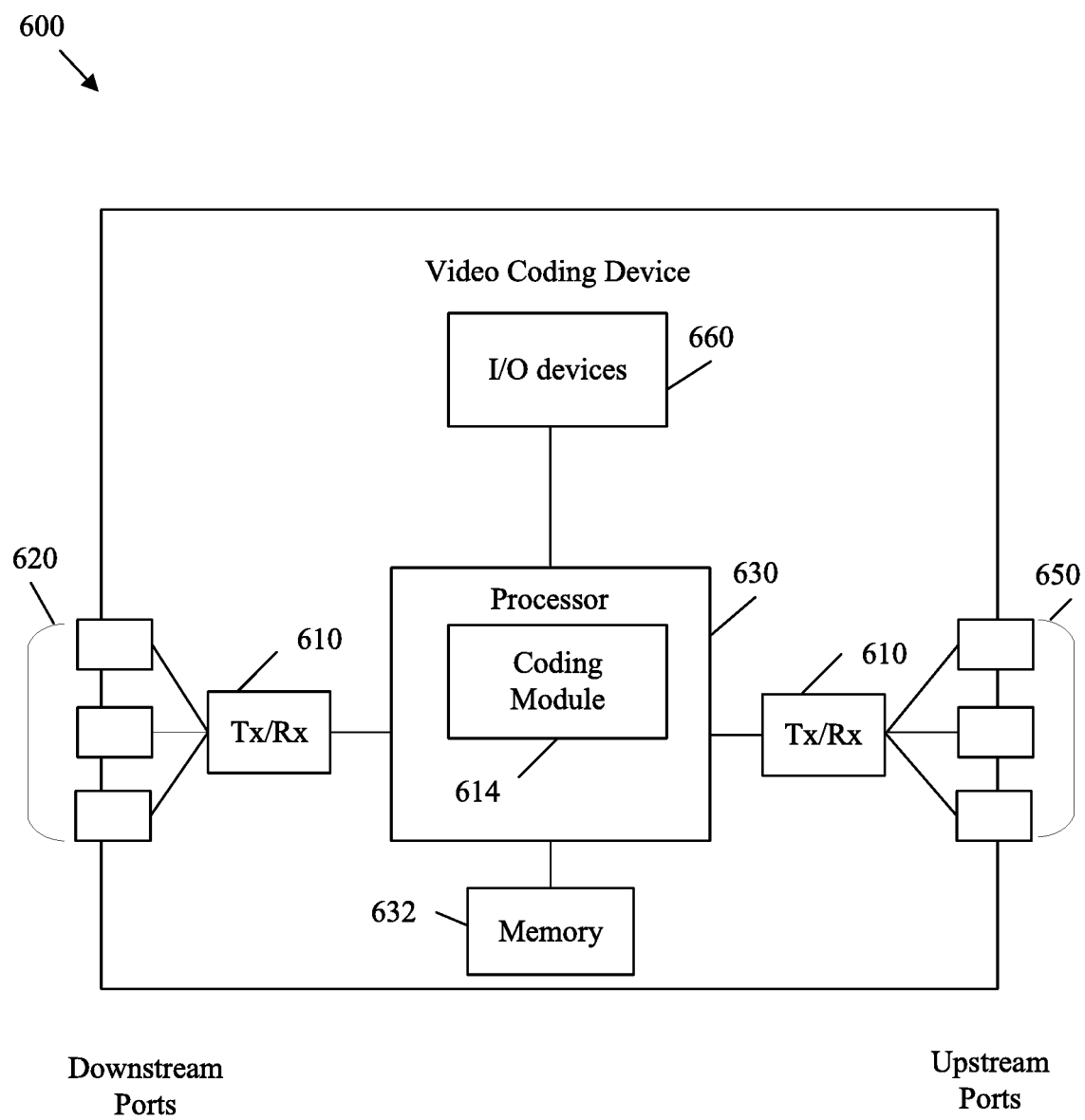
FIG. 6 is a schematic diagram of an example video coding device.

FIG. 6 is a schematic diagram of an example video coding device 600. The video coding device 600 is suitable for implementing the disclosed examples/embodiments as described herein. The video coding device 600 comprises downstream ports 620, upstream ports 650, and/or transceiver units (Tx/Rx) 610, including transmitters and/or receivers for communicating data upstream and/or downstream over a network. The video coding device 600 also includes a processor 630 including a logic unit and/or central processing unit (CPU) to process the data and a memory 632 for storing the data. The video coding device 600 may also comprise electrical, optical-to-electrical (OE) components, electrical-to-optical (EO) components, and/or wireless communication components coupled to the upstream ports 650 and/or downstream ports 620 for communication of data via electrical, optical, or wireless communication networks. The video coding device 600 may also include input and/or output (I/O) devices 660 for communicating data to and from a user. The I/O devices 660 may include output devices such as a display for displaying video data, speakers for outputting audio data, etc. The I/O devices 660 may also include input devices, such as a keyboard, mouse, trackball, etc., and/or corresponding interfaces for interacting with such output devices.

The processor 630 is implemented by hardware and software. The processor 630 may be implemented as one or more CPU chips, cores (e.g., as a multi-core processor), field-programmable gate arrays (FPGAs), application specific integrated circuits (ASICs), and digital signal processors (DSPs). The processor 630 is in communication with the downstream ports 620, Tx/Rx 610, upstream ports 650, and memory 632. The processor 630 comprises a coding module 614. The coding module 614 implements the disclosed embodiments described herein, such as methods 100, 700, and 800, which may employ a bitstream 500. The coding module 614 may also implement any other method/mechanism described herein. Further, the coding module 614 may implement a codec system 200, an encoder 300, and/or a decoder 400. For example, the coding module 614 can encode slices of pictures into a bitstream. Further, the coding module 614 can determine ALF parameters to apply when filtering the slices. The coding module 614 can encode the ALF parameters into one or more ALF APSs. The coding module 614 can apply constraints to the ALF APS. For example, the coding module 614 can ensure that each ALF APS contains a luma filter set, a chroma filter set, or both. Further, the coding module 614 can set an ALF luma filter signal flag and an ALF chroma filter signal flag for each ALF APS. Specifically, the coding module 614 can ensure that at least one of the ALF luma filter signal flag and the ALF chroma filter signal flag are equal to one in order to ensure that each ALF APS contains at least one luma or chroma filter set. Further, the coding module 614 can ensure that the ALF APS sets the ALF luma filter signal flag and/or the ALF chroma filter signal flag when a corresponding slice header points to an ALF APS for a luma filter set and/or a chroma filter set, respectively. Hence, coding module 614 causes the video coding device 600 to provide additional functionality and/or coding efficiency when coding video data. As such, the coding module 614 improves the functionality of the video coding device 600 as well as addresses problems that are specific to the video coding arts. Further, the coding module 614 effects a transformation of the video coding device 600 to a different state. Alternatively, the coding module 614 can be implemented as instructions stored in the memory 632 and executed by the processor 630 (e.g., as a computer program product stored on a non-transitory medium).

The memory 632 comprises one or more memory types such as disks, tape drives, solid-state drives, read only memory (ROM), random access memory (RAM), flash memory, ternary content-addressable memory (TCAM), static random-access memory (SRAM), etc. The memory 632 may be used as an over-flow data storage device, to store programs when such programs are selected for execution, and to store instructions and data that are read during program execution.

Figure 7:
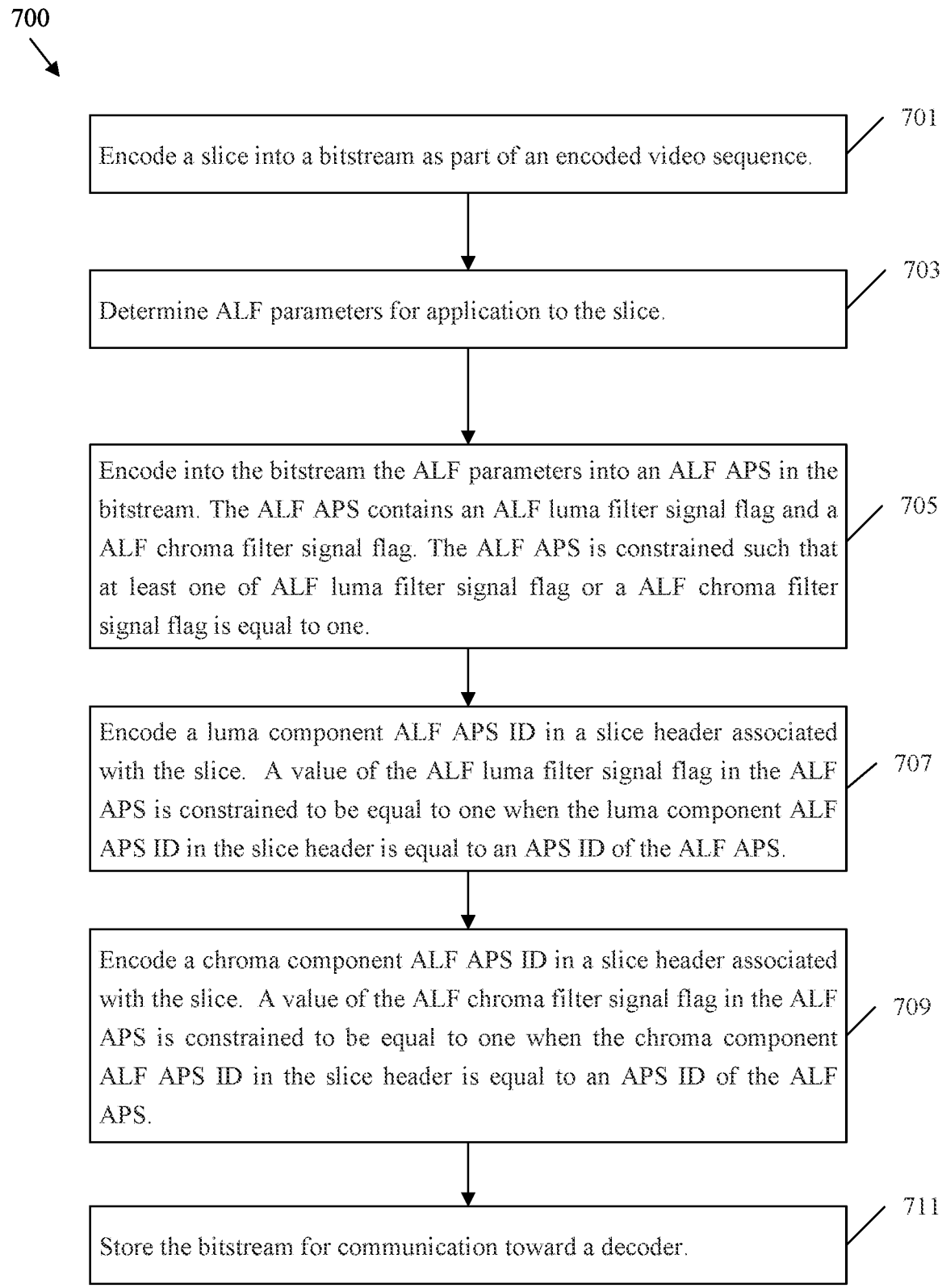
FIG. 7 is a flowchart of an example method of encoding a video sequence into a bitstream by employing an ALF APS with constraints.

FIG. 7 is a flowchart of an example method 700 of encoding a video sequence into a bitstream, such as bitstream 500, by employing an ALF APS with constraints. Method 700 may be employed by an encoder, such as a codec system 200, an encoder 300, and/or a video coding device 600 when performing method 100.

Method 700 may begin when an encoder receives a video sequence including a plurality of pictures and determines to encode that video sequence into a bitstream, for example based on user input. At step 701, a slice of a picture is encoded into a bitstream as part of an encoded video sequence. The slice may contain coded luma components, coded chroma components, or combinations thereof.

At step 703, the decoder determines ALF parameters for application to the slice. For example, the decoder can decode the encoded slice and apply the ALF parameters to the decoded slice. The encoder can then iteratively adjust the ALF parameters in order to create the highest quality decoded slice while balancing for coding efficiency constraints. This can be performed as part of the RDO process. The ALF parameters that result in the highest quality decoded slice can then be stored for encoding into the bitstream. The ALF parameters may include a luma filter set for application to decoded luma samples, a chroma filter set for application to decoded chroma samples, or both.

At step 705, the ALF parameters are encoded into an ALF APS in the bitstream. The ALF APS is encoded to contain an ALF luma filter signal flag and a ALF chroma filter signal flag. In some examples, the ALF luma filter signal flag is denoted as alf_luma_filter_signal_flag. Further, the alf_luma_filter_signal_flag specifies whether a luma filter set is signaled in the ALF APS. In some examples, the ALF chroma filter signal flag is denoted as alf_chroma_filter_signal_flag. Further, the alf_chroma_filter_signal_flag specifies whether a chroma filter set is signaled in the ALF APS. The ALF APS is constrained such that at least one of the ALF luma filter signal flag the ALF chroma filter signal flag is set equal to one. This ensures that the ALF APS contains at least one filter set.

At step 707, a luma component ALF APS ID may be encoded in a slice header associated with the slice. The luma component ALF APS ID indicates the APS ID of the ALF APS that contains the luma filter set for the slice corresponding to the slice header. Accordingly, the value of the ALF luma filter signal flag in the ALF APS of step 705 is constrained to be equal to one when the luma component ALF APS ID in the slice header is equal to the APS ID of the ALF APS. In some examples, the luma component ALF APS ID is denoted as slice_alf_aps_id_luma[i]. For example, the slice_alf_aps_id_luma[i] may specify an APS ID (adaptation_parameter_set_id) of an i-th ALF APS referred to by a luma component of the slice.

At step 709, a chroma component ALF APS ID may be encoded in a slice header associated with the slice. The chroma component ALF APS ID indicates the APS ID of the ALF APS that contains the chroma filter set for the slice corresponding to the slice header. Accordingly, the value of the ALF chroma filter signal flag in the ALF APS of step 705 is constrained to be equal to one when the chroma component ALF APS ID in the slice header is equal to the APS ID of the ALF APS. In some examples, the chroma component ALF APS ID is denoted as slice_alf_aps_id_chroma. For example, the slice_alf_aps_id_chroma may specify an adaptation_parameter_set_id of an ALF APS referred to by a chroma component of the slice.

At step 711, the bitstream may be stored at the encoder for communication toward a decoder.

Figure 8:
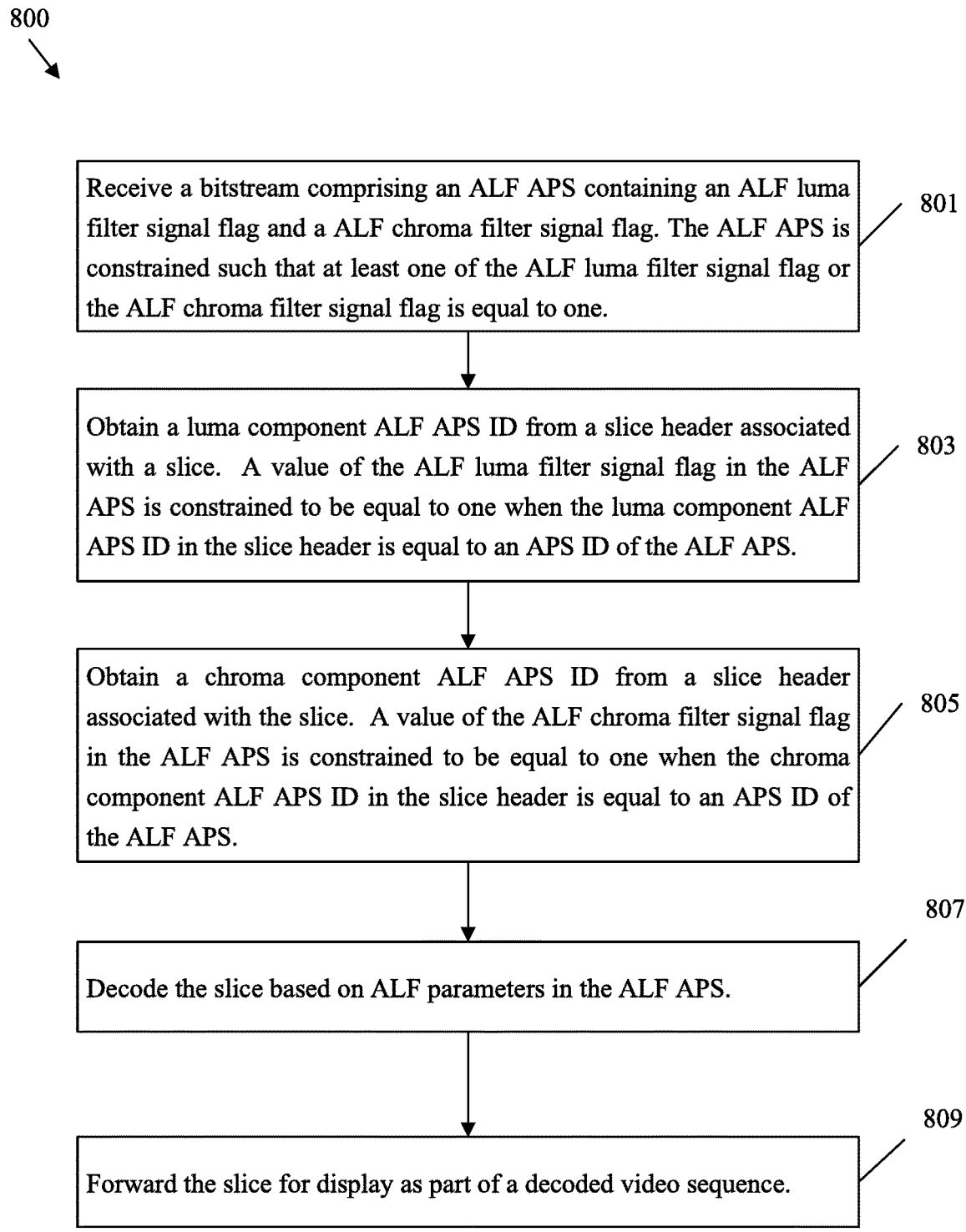
FIG. 8 is a flowchart of an example method of decoding a video sequence from a bitstream by employing an ALF APS with constraints.

FIG. 8 is a flowchart of an example method 800 of decoding a video sequence from a bitstream, such as bitstream 500, by employing an ALF APS with constraints. Method 800 may be employed by a decoder such as a codec system 200, a decoder 400, and/or a video coding device 600 when performing method 100.

Method 800 may begin when a decoder begins receiving a bitstream of coded data representing a video sequence, for example as a result of method 700. At step 801, the decoder can receive a bitstream. The bitstream comprises a coded slice and an associated slice header. The slice may contain coded luma components, coded chroma components, or combinations thereof. The bitstream also comprises an ALF APS. The ALF APS contains ALF parameters. The ALF parameters may include a luma filter set for application to decoded luma samples, a chroma filter set for application to decoded chroma samples, or both. The ALF APS contains an ALF luma filter signal flag and a ALF chroma filter signal flag. In some examples, the ALF luma filter signal flag is denoted as alf_luma_filter_signal_flag. Further, the alf_luma_filter_signal_flag specifies whether a luma filter set is signaled in the ALF APS. In some examples, the ALF chroma filter signal flag is denoted as alf_chroma_filter_signal_flag. Further, the alf_chroma_filter_signal_flag specifies whether a chroma filter set is signaled in the ALF APS. The ALF APS is constrained such that at least one of the ALF luma filter signal flag or the ALF chroma filter signal flag is set equal to one. This ensures that the ALF APS contains at least one filter set.

At step 803, the decoder can obtain a luma component ALF APS ID from a slice header associated with a slice. The luma component ALF APS ID indicates the APS ID of the ALF APS that contains the luma filter set for the slice corresponding to the slice header. Accordingly, the value of the ALF luma filter signal flag in the ALF APS of step 801 is constrained to be equal to one when the luma component ALF APS ID in the slice header is equal to the APS ID of the ALF APS. In some examples, the luma component ALF APS ID is denoted as slice_alf_aps_id_luma[i]. For example, the slice_alf_aps_id_luma[i] may specify an adaptation_parameter_set_id of an i-th ALF APS referred to by a luma component of the slice. Therefore, the decoder can obtain the luma filter set for the slice from the ALF APS based on the luma component ALF APS ID in the slice header.

At step 805, the decoder can obtain a chroma component ALF APS ID from a slice header associated with the slice. The chroma component ALF APS ID indicates the APS ID of the ALF APS that contains the chroma filter set for the slice corresponding to the slice header. Accordingly, the value of the ALF chroma filter signal flag in the ALF APS of step 801 is constrained to be equal to one when the chroma component ALF APS ID in the slice header is equal to the APS ID of the ALF APS. In some examples, the chroma component ALF APS ID is denoted as slice_alf_aps_id_chroma. For example, the slice_alf_aps_id_chroma may specify an adaptation_parameter_set_id of an ALF APS referred to by a chroma component of the slice.

At step 807, the decoder can decode the slice based on ALF parameters in the ALF APS. For example, the decoder can obtain the luma filter set and/or the chroma filter set based on the flags in the slice header and/or in the ALF APS. The decoder can then configure the ALF based on the luma filter set and/or the chroma filter set. Further, the decoder can decode the slice and apply the ALF parameters to the decoded slice to create a reconstructed slice as part of a reconstructed picture.

At step 809, the decoder can forward the slice for display as part of a decoded video sequence. For example, the decoder can include the slice with other slices to reconstruct a picture. The picture can then be ordered with other pictures to create the decoded video sequence. The pictures can be forwarded for display in order to display the decoded video sequence to a user.

Figure 9:
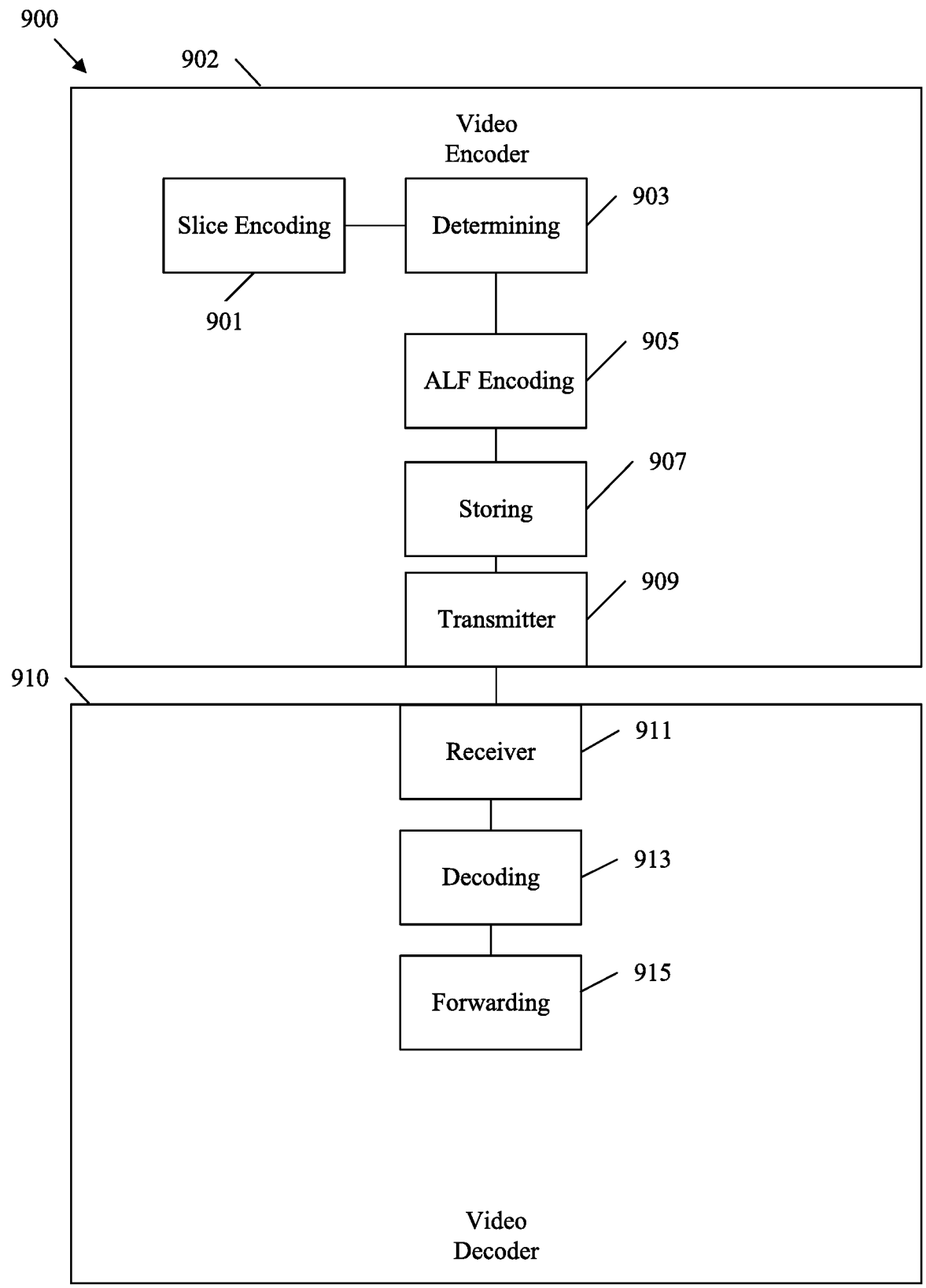
FIG. 9 is a schematic diagram of an example system for coding a video sequence of images in a bitstream by employing an ALF APS with constraints.

FIG. 9 is a schematic diagram of an example system 900 for coding a video sequence of images in a bitstream, such as bitstream 500, by employing an ALF APS with constraints. System 900 may be implemented by an encoder and a decoder such as a codec system 200, an encoder 300, a decoder 400, and/or a video coding device 600. Further, system 900 may be employed when implementing method 100, 700, and/or 800.

The system 900 includes a video encoder 902. The video encoder 902 comprises a slice encoding module 901 for encoding a slice into a bitstream as part of an encoded video sequence. The video encoder 902 further comprises a determining module 903 for for determining ALF parameters for application to the slice. The video encoder 902 further comprises an ALF encoding module 905 for encoding the ALF parameters in an ALF APS in the bitstream, the ALF APS containing an ALF luma filter signal flag and a ALF chroma filter signal flag and constrained such that at least one of the ALF luma filter signal flag and the ALF chroma filter signal flag are equal to one. The video encoder 902 further comprises a storing module 907 for storing the bitstream for communication toward a decoder. The video encoder 902 further comprises a transmitting module 909 for transmitting the bitstream to support decoding the slice at a decoder as part of a decoded video sequence. The video encoder 902 may be further configured to perform any of the steps of method 700.

The system 900 also includes a video decoder 910. The video decoder 910 comprises a receiving module 911 for receiving a bitstream comprising an ALF APS containing an ALF luma filter signal flag and a ALF chroma filter signal flag and constrained such that at least one of the ALF luma filter signal flag and the ALF chroma filter signal flag are equal to one. The video decoder 910 further comprises a decoding module 913 for decoding a slice based on ALF parameters in the ALF APS. The video decoder 910 further comprises a forwarding module 915 for forwarding the slice for display as part of a decoded video sequence. The video decoder 910 may be further configured to perform any of the steps of method 800.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a decoder, the method comprising:
receiving a bitstream comprising encoded video data for a slice and an adaptation parameter set (APS), wherein the APS comprises an APS identifier (adaptation_parameter_set_id) and an APS parameters type (aps_params_type), wherein the adaptation_parameter_set_id specifies an identifier for the APS, the aps_params_type specifies a type of parameter that is contained in the APS, wherein when the aps_params_type is equal to adaptive loop filter (ALF) APS (ALF_APS), the APS comprises an ALF and is an ALF APS, wherein the ALF APS comprises an ALF luma filter signal flag (alf_luma_filter_signal_flag) and an ALF chroma filter signal flag (alf_chroma_filter_signal_flag), wherein a value of the alf_luma_filter_signal_flag of an APS network abstraction layer (NAL) unit having the aps_params_type equal to ALF_APS and the adaptation_parameter_set_id equal to slice ALF APS identifier luma (slice_alf_aps_id_luma[i]) is constrained to be equal to one, wherein a value of the alf_chroma_filter_signal_flag of the APS NAL unit having the aps_params_type equal to ALF_APS and the adaptation_parameter_set_id equal to slice ALF APS identifier chroma (slice_alf_aps_id_chroma) is constrained to be equal to one, wherein slice_alf_aps_id_luma[i] specifies an adaptation_parameter_set_id of an i-th ALF APS referred to by a luma component of the slice, and wherein slice_alf_aps_id_chroma specifies the adaptation_parameter_set_id of the ALF APS referred to by a chroma component of the slice;
decoding a luma filter set when the alf_luma_filter_signal_flag specifies the luma filter set is signaled in the ALF APS;
decoding a chroma filter set when the alf_chroma_filter_signal_flag specifies the chroma filter set is signaled in the ALF APS; and
decoding the slice based on ALF parameters in the ALF APS, wherein the ALF parameters comprise the luma filter set or the chroma filter set.

2. The method of claim 1, wherein the alf_luma_filter_signal_flag specifies whether the luma filter set is signaled.

3. The method of claim 1, wherein the alf_chroma_filter_signal_flag specifies whether the chroma filter is signaled.

4. A method implemented by an encoder, the method comprising:
encoding a slice into a bitstream as part of an encoded video sequence;
encoding an adaptation parameter set (APS) into the bitstream, wherein the APS comprises an APS identifier (adaptation_parameter_set_id) and an APS parameters type (aps_params_type), wherein the adaptation_parameter_set_id specifies an identifier for the APS, the aps_params_type specifies a type of parameter that is contained in the APS, wherein when the aps_params_type is equal to adaptive loop filter (ALF) APS (ALF_APS), the APS comprises an ALF and is an ALF APS;
determining ALF parameters for application to the slice, wherein the ALF parameters comprise a luma filter set or a chroma filter set;
encoding the ALF parameters into the ALF APS in the bitstream, the ALF APS comprising an ALF luma filter signal flag (alf_luma_filter_signal_flag) and an ALF chroma filter signal flag (alf_chroma_filter_signal_flag), wherein a value of the alf_luma_filter_signal_flag of an APS network abstraction layer (NAL) unit having the aps_params_type equal to ALF_APS and the adaptation_parameter_set_id equal to slice ALF APS identifier luma (slice_alf_aps_id_luma[i]) is constrained to be equal to one, wherein a value of the alf_chroma_filter_signal_flag of the APS NAL unit having the aps_params_type equal to ALF_APS and the adaptation_parameter_set_id equal to slice ALF APS identifier chroma (slice_alf_aps_id_chroma) is constrained to be equal to one, wherein slice_alf_aps_id_luma[i] specifies an adaptation_parameter_set_id of an i-th ALF APS referred to by a luma component of the slice, and wherein slice_alf_aps_id_chroma specifies the adaptation_parameter_set_id of the ALF APS referred to by a chroma component of the slice; and
storing the bitstream for communication toward a decoder.

5. The method of claim 4, wherein the alf_luma_filter_signal_flag specifies whether the luma filter set is signaled in the ALF APS.

6. The method of claim 4, wherein the alf_chroma_filter_signal_flag specifies whether the chroma filter is signaled in the ALF APS.

7. A decoder comprising:
a receiver configured to receive a bitstream comprising encoded video data for a slice and an adaptation parameter set (APS), wherein the APS comprises an APS identifier (adaptation_parameter_set_id) and an APS parameters type (aps_params_type), wherein the adaptation_parameter_set_id specifies an identifier for the APS, the aps_params_type specifies a type of parameter that is contained in the APS, wherein when the aps_params_type is equal to adaptive loop filter (ALF) APS (ALF_APS), the APS comprises an ALF and is an ALF APS, wherein the ALF APS comprises an ALF luma filter signal flag (alf_luma_filter_signal_flag) and an ALF chroma filter signal flag (alf_chroma_filter_signal_flag), wherein a value of the alf_luma_filter_signal_flag of an APS network abstraction layer (NAL) unit having the aps_params_type equal to ALF_APS and the adaptation_parameter_set_id equal to slice ALF APS identifier luma (slice_alf_aps_id_luma[i]) is constrained to be equal to one, wherein a value of the alf_chroma_filter_signal_flag of the APS NAL unit having the aps_params_type equal to ALF_APS and the adaptation_parameter_set_id equal to slice ALF APS identifier chroma (slice_alf_aps_id_chroma) is constrained to be equal to one, wherein slice_alf_aps_id_luma[i] specifies an adaptation_parameter_set_id of an i-th ALF APS referred to by a luma component of the slice, and wherein slice_alf_aps_id_chroma specifies the adaptation_parameter_set_id of the ALF APS referred to by a chroma component of the slice; and
a processor coupled to the receiver and configured to:
decode a luma filter set when the alf_luma_filter_signal_flag specifies the luma filter set is signaled in the ALF APS;

decode a chroma filter set when the alf_chroma_filter_signal_flag specifies the chroma filter set is signaled in the ALF APS; and decode the slice based on ALF parameters in the ALF APS, wherein the ALF parameters comprise the luma filter set or the chroma filter set.

8. The decoder of claim 7, wherein the alf_luma_filter_signal_flag specifies whether the luma filter set is signaled.

9. The decoder of claim 7, wherein the alf_chroma_filter_signal_flag specifies whether the chroma filter is signaled.

10. The decoder of claim 7, wherein the slice_alf_aps_id_luma[i] and the slice_alf_aps_id_chroma are contained in a slice header of the slice.

11. The method of claim 1, wherein the slice_alf_aps_id_luma[i] and the slice_alf_aps_id_chroma are contained in a slice header of the slice.

12. The method of claim 4, wherein the slice_alf_aps_id_luma[i] and the slice_alf_aps_id_chroma are contained in a slice header of the slice.

* * * * *